(12) United States Patent
James

(10) Patent No.: US 8,533,234 B2
(45) Date of Patent: Sep. 10, 2013

(54) CUSTOM DATA DISPLAY

(75) Inventor: Eric James, Elgin, IL (US)

(73) Assignee: Aspect Software, Inc., Chelmsford, MA (US)

( * ) Notice: Subject to any disclaimer, the term of this patent is extended or adjusted under 35 U.S.C. 154(b) by 294 days.

(21) Appl. No.: 12/287,172

(22) Filed: Oct. 7, 2008

(65) Prior Publication Data
US 2010/0088347 A1   Apr. 8, 2010

(51) Int. Cl.
*G06F 7/00* (2006.01)
(52) U.S. Cl.
USPC .......................................... 707/802
(58) Field of Classification Search
USPC ............. 707/602, 634, 706, 731, 736, 752, 707/767, 769, 770, 791, 793, 802, 804, 805, 707/999.001, 999.01, 999.1, 999.101–999.107, 707/999.2–999; 345/594, 650, 661, 674, 345/676, 688, 520; 705/26, 27; 715/212, 715/215, 217–225, 234, 271, 713, 718, 726, 715/735, 744–746, 748, 760, 762, 765, 784, 715/715/809, 810, 819, 820, 825, 828–831, 715/833, 841, 845, 861, 866, 961, 968
See application file for complete search history.

(56) References Cited

U.S. PATENT DOCUMENTS

| | | | | |
|---|---|---|---|---|
| 5,966,695 A * | 10/1999 | Melchione et al. | .......... | 705/7.33 |
| 2004/0229730 A1* | 11/2004 | Ainsworth et al. | ............... | 482/8 |
| 2007/0038610 A1* | 2/2007 | Omoigui | ........................... | 707/3 |
| 2007/0050340 A1* | 3/2007 | von Kaenel et al. | ............... | 707/3 |
| 2007/0100809 A1* | 5/2007 | Dettinger et al. | ................. | 707/4 |
| 2008/0046462 A1* | 2/2008 | Kaufman et al. | ............. | 707/102 |
| 2010/0211515 A1* | 8/2010 | Woodings et al. | ............ | 705/320 |

OTHER PUBLICATIONS

"Virtual Folder" (Aug. 9, 2008) available at http://en.wikipedia.org/wiki/virtual_folder.

* cited by examiner

*Primary Examiner* — Hosain Alam
*Assistant Examiner* — Reza Hosseini
(74) *Attorney, Agent, or Firm* — Husch Blackwell LLP

(57) ABSTRACT

Method and system for providing an open-ended and modifiable ability to customize the display of data for current viewing of the display for purposes such as, but not limited to, Contact Center administration and management.

26 Claims, 5 Drawing Sheets

CUSTOM DATA DISPLAY

This invention pertains to providing an open-ended and modifiable ability to customize the display of data for current viewing of the display for purposes such as, but not limited to, Contact Center administration and management.

DETAILED DESCRIPTION OF SOME EMBODIMENTS

Figure 1:
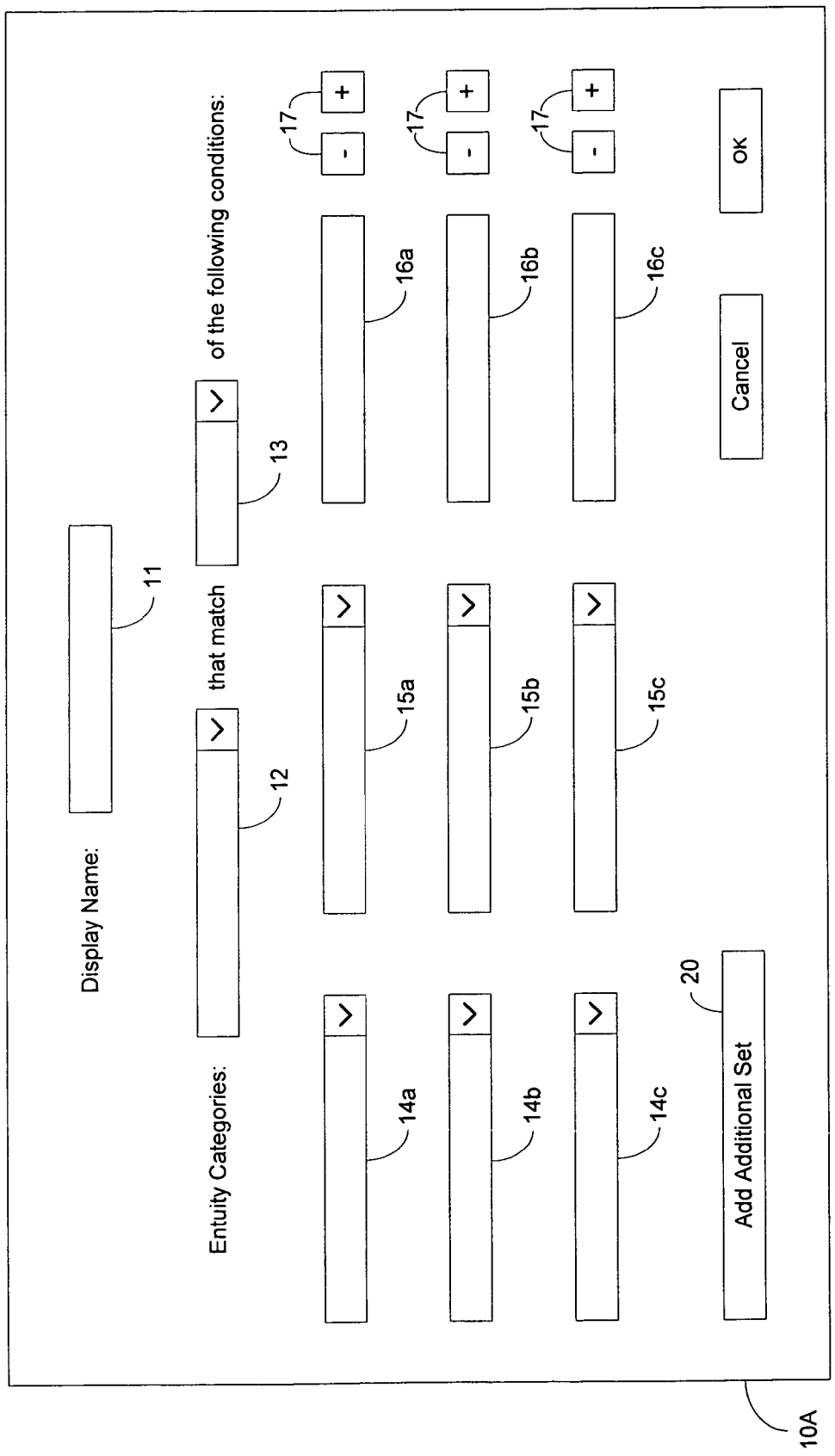
FIG. 1 is an example of a screen for defining a custom display.

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated or described.

Various types of specific reports, statistics, metrics, and other data are typically captured for use such as, but not limited to, administering Contact Centers that, among other functions, distribute to available agents the telephone calls or other contacts that are made to an organization. Contact Center administration may involve, interact with, or rely on multiple different systems and multiple different versions of systems. Different automatic contact distribution (ACD) systems, workforce management systems, and data collection and reporting systems are examples of types of Contact Center related systems (such as Spectrum Enterprise Administrator™, Spectrum Enterprise Resource Monitor™, Spectrum Enterprise Monitor™, Spectrum Enterprise Developers Kit™, Spectrum Datamart™, Unified IP Alert Server™, Unified IP Enterprise Monitor™, Unified IP Datamart™, Aspect Viewpoint Server™, Aspect Quality Management™, and Enterprise Workforce Management™). Different systems often have similar entity categories that have some attributes or properties in common as well as attributes or properties that are unique. The entity categories and components in different systems are related in different ways. It is desirable to minimize the need to redesign databases and graphical user interfaces and/or to build in new hard-coded logic whenever there are new or revised systems or new or revised entity categories, just to permit display of various members of entity categories from each different Contact Center system. Instead, the user is allowed to define and modify custom metadata in order to view a system-independent, custom display of data that is desired.

The user is allowed to define specific queries or rules to create a custom display of only specifically desired members of entity categories. The user can view the desired members without any necessity to understand the complex relationships that exist between entity categories and among different components of the different systems. There is no need to revise viewer functionality software when systems are added or modified, when entity categories are added or modified, or when a custom display is added or modified.

FIG. 1 is an example of a screen 10A that can be generated for a user to define a custom display. The user can specify a display name in box 11. This user-specified display name will be stored in association with the queries that define the custom display. Future requests for a current view of the particular custom display will be implemented by requesting the user-specified display name. The current view will show the members that qualify for inclusion in the display at the time of the request for the view.

Continuing with the example of FIG. 1, box 12 is a drop-down for selection of an entity category. For example, some entity categories can correspond with database tables available in the different systems that will be queried. For example, some entity categories can correspond with constantly changing information being tracked by real-time systems that can be accessed. For example, an entity category for agents might encompass static information (such as biographical information), and/or information that changes relatively slowly (such as training qualifications or historical performance statistics), and/or constantly changing information (such as current number of contacts in queue or current availability state (such as active, hold, idle, not ready, and so forth)). For example, some entity categories can comprise information about revenues, billing, expenses, customers, suppliers, productivity, employees, inventories, status of different steps of processes, tracking of manufacturing components, and so forth.

Specifically with respect to Contact Centers, possible entity categories can comprise for example agent groups, agent super groups, trunk groups (i.e., collections of telephone lines), ANIs (i.e., caller numbers), DNISs (i.e., called numbers), supervisor teams, agent supervisors, announcements, categories of contact subject matter (e.g., billing, sales, maintenance support, etc.), classes of service (i.e., standard sets of permissions such as only in-calls, etc.), clients of a central administering system (e.g., outside observers monitoring statistics), system managers, and technicians.

Some other examples of entity categories that may be found useful for administering a Contact Center comprise data about the performance, the productivity, the services that can be provided, the availability state, etc. by a particular agent or by a particular category of agents; about contact processing times and backlogs in various steps of the process; about various information based on different contact types (such as telephone calls, facsimiles, e-mail, voice over internet contacts, web chats, incoming contacts, outgoing contacts, and so forth); about various information based on different services or different categories of services; about the current status of contacts; and so forth. The following are a few more specific examples of Contact Center administration data:

(1) for a particular service or for a particular category of services: a number or a percentage of agents in a particular availability state; a percentage of time that a particular agent or a particular category of agents is in a particular availability state; an average length of time it takes for a customer to answer a call-back; an average length of time a contact remains in a queue before being processed; an average length of time a customer is willing to wait in a queue before abandoning a contact; a number or a percentage of contacts that terminated before being placed in a queue for the particular service; a number of contacts answered; a number of contacts currently in progress; a number of contacts currently in queue; a number of unanswered contact messages (such as voice-mail or e-mail, for example); a number or a percentage of contacts that have been offered the particular service; a number or a percentage of contacts that have overflowed; a number or a percentage of contacts that have been rejected; a number or a percentage of contacts that have been rerouted; a number or a percentage of contacts serviced within a target queue time; a number or a percentage of contacts transferred to a particular agent; a number or a percentage of contacts transferred to a particular category of agents; a number or a percentage of contacts transferred to a particular external source; a number or a percentage of contacts transferred to a particular category of external sources; a number or a percentage of contacts transferred to a different service; a longest queue wait time; a highest number of contacts in queue for the particular service; productive time of a particular agent; productive time of a particular category of agents; a number or a percentage of contacts that were serviced; a number or a percentage of a particular type of contact; a number of consultation contacts; etc.

(2) for a particular agent: a time when the particular agent began servicing a particular contact; an availability state of the particular agent; a percentage of time the particular agent is in a particular availability state; a length of time the particular agent has been in a particular availability state; different services which the particular agent can provide; a number of contacts answered; a number or a percentage of contacts that have been rejected; a number or a percentage of contacts that have been rerouted; a number of contacts transferred to the particular agent; a number or a percentage of contacts transferred to a particular external source; a number or a percentage of contacts transferred to a particular category of external sources; productive time; a number or a percentage of a particular type of contact; a number of consultation contacts; etc.

(3) for a particular category of agents: an average length of time that agents of the particular category of agents have been in a particular availability state; an average percentage of time that agents of the particular category of agents are in a particular availability state; different services which the particular category of agents can provide; a number or a percentage of agents who can provide a particular service; a number of agents; a number or a percentage of agents in a particular availability state; a number of contacts answered; a number or a percentage of contacts that have been rejected; a number or a percentage of contacts that have been rerouted; a number or a percentage of contacts transferred to the particular category of agents; a number or a percentage of contacts transferred to a particular external source; a number or a percentage of contacts transferred to a particular class of external sources; productive time; an average length of time a contact remains in a queue before being processed; a number of contacts currently in progress; a number of contacts currently in queue; a number of unanswered contact messages; a number or a percentage of contacts that have been offered a particular service; a number or a percentage of contacts that have overflowed; a number or a percentage of contacts serviced within a target queue time; a number or a percentage of contacts transferred to a particular agent; a longest queue wait time; a highest number of contacts in queue; productive time; a number or a percentage of a particular type of contact; a number of consultation contacts; etc.

(4) for a particular type of contact: a number or a percentage of agents in a particular availability state; a percentage of time that a particular agent or a particular category of agents is in a particular availability state; an average length of time a contact remains in a queue before being processed; an average length of time a customer is willing to wait in a queue before abandoning a contact; a number of contacts that terminated before being placed in a queue for a particular service; a number of contacts answered; a number of contacts currently in progress; a number of contacts currently in queue; a number of unanswered contact messages; a number or a percentage of contacts that have overflowed; a number or a percentage of contacts that have been rejected; a number or a percentage of contacts that have been rerouted; a number or a percentage of contacts serviced within a target queue time; a number or a percentage of contacts transferred to a particular agent; a number or a percentage of contacts transferred to a particular category of agents; a number or a percentage of contacts transferred to a particular external source; a number or a percentage of contacts transferred to a particular category of external sources; a longest queue wait time; a highest number of contacts in queue for the particular type of contact; productive time of a particular agent; productive time of a particular category of agents; a number or a percentage of contacts that were serviced; a number of consultation contacts; a number or a percentage of contacts that have been offered a particular service; etc.

Continuing with the example of FIG. 1, box 13 is a drop-down for specifying certain qualifications with respect to the conditions that follow. For example, the box 13 drop-down can include "all" if all of the conditions are required, and "any" if only one of the conditions is required, and possibly some other qualifications that a potential user may desire such as "at least two", "the first condition plus one other condition", and so forth.

Continuing with the example of FIG. 1, box 14a is a drop-down for selection of a field that exists for an entity category selected in box 12. For example, an entity category of agents can include multiple fields such as last name, first name, middle name(s), nickname, work group, supervisor, class of service, level of training or experience in different subject matters (such as sales of different products or services, technical support regarding the operation of different products or services, billing or accounting matters, etc.), level of training or experience in different types of communication (such as telephone contacts, chat messaging, multi-channel chat messaging, etc.), historical productivity information, current status information (such as current availability, length of time servicing current contact, number of contacts in queue, etc.), and so forth.

Continuing with the example of FIG. 1, box 15a is a drop-down for selection of a type of condition that is appropriate for the field that was selected in box 14a, and the user would specify a value for the condition in box 16a.

Examples of types of conditions for fields containing string values comprise "contains" (the specified string value is included within the field), "does not contain" (the specified string value is not included within the field), "is" (the value in the field is an exact match with the specified string value), "is not" (the value in the field does not match the specified string value), "starts with" (the value in the field starts with the specified string value), "ends with" (the value in the field ends with the specified string value), and so forth. For example, if the entity category is agents and the field is last name, the condition "contains tst" would be satisfied by "Gutstop" and not by "Stembottom". Similarly, the condition "does not contain tst" would be satisfied by "Applerot" but not by "Gutstop", and so forth.

Examples of types of conditions for fields containing numeric values comprise "is" (the value in the field is an exact match with the specified numeric value), "is not" (the value in the field does not match the specified numeric value), "is greater than" (the value in the field exceeds the specified numeric value), "is less than" (the value in the field is less than the specified numeric value), "is in the range" (the value in the field is within the specified numeric range), and so forth.

The example of FIG. 1 shows three lines of boxes for specifying fields and conditions to be applied in querying those fields. That is, queries of a field specified in box 14b would be governed by conditions specified in boxes 15b and 16b, and queries of a field specified in box 14c would be governed by conditions specified in boxes 15c and 16c. However, a user is not required to specify three fields (and corresponding conditions), but can use fewer or more as appropriate. The + and − boxes 17 allow a user to add or delete lines of boxes. Therefore, the user can specify any number of fields and corresponding conditions. The same field can be repeated with a different condition. In this way, the user can be as particular and narrow as desired in defining which members of a selected entity category will satisfy the query for inclusion in the custom display.

Furthermore, the user can define a custom display to include more than one query of one entity category. This is especially useful when different systems include similar database entity categories, and any one of those entity categories may have some of the same fields as the other similar entity categories and also may have some different fields than the other similar entity categories. For example, two systems may each have an entity category for agents, and each may have a field for first names but only one may have a field for nicknames.

Figure 2:
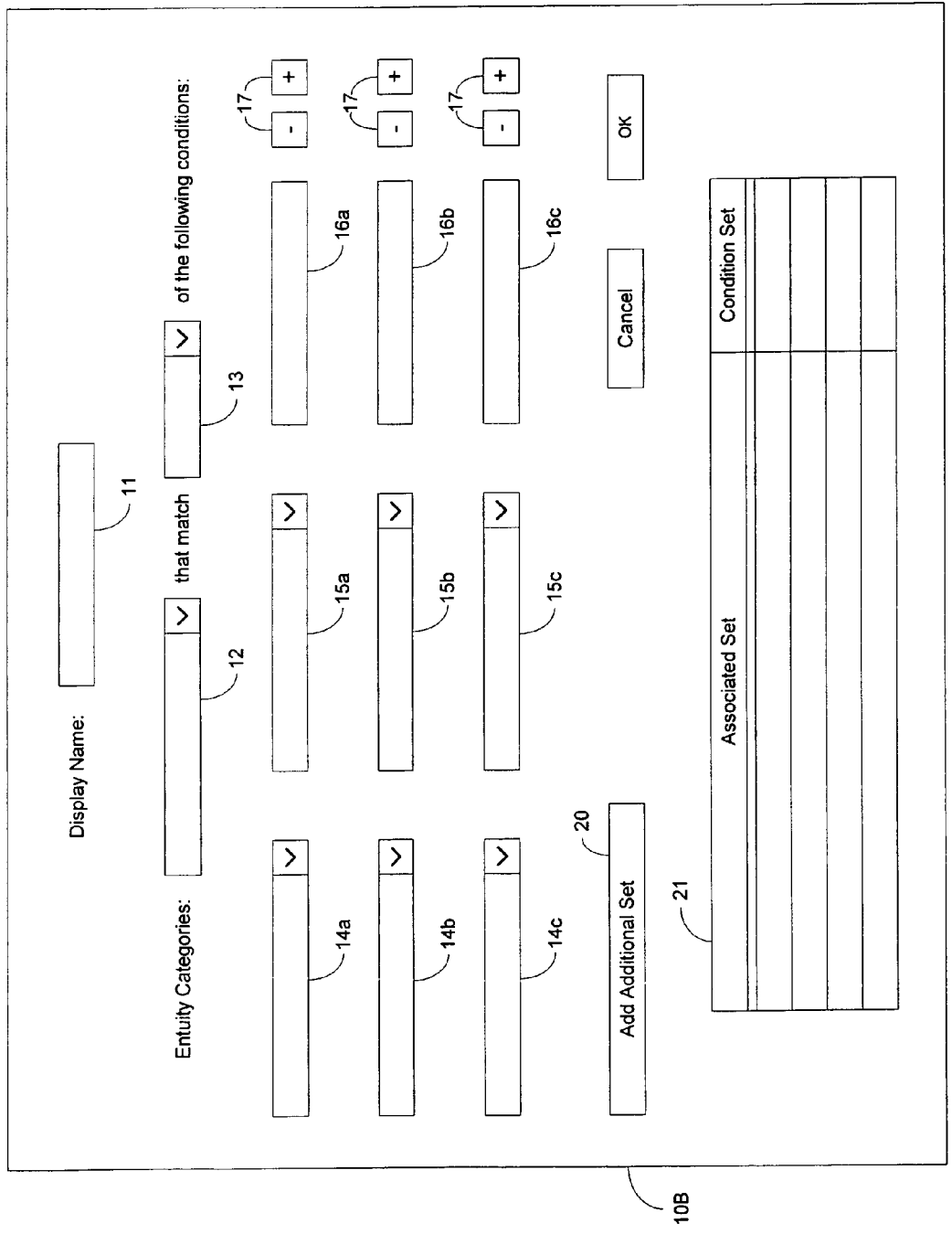
FIG. 2 is an example of a screen for defining a custom display that includes multiple associated sets of data.

In the example of FIG. 1, box 20 allows a user to add an additional set to the custom display. It can generate a screen 10B as shown in the example of FIG. 2, that allows the user to specify an additional set comprising an entity category and the conditions that its members must satisfy for inclusion in the custom display. The display name in box 11 of a screen 10B can be similar to the display name of the parent screen 10A, such as a core name common to each of the associated sets with a suffix or a modifier to identify the separate ones of the associated sets.

Any number of sets can be associated with the same custom display. Each of the sets associated with the same custom display can be listed, possibly with a corresponding condition set, as shown in box 21 in the example of FIG. 2. In this way, a single request for a current view of a particular custom display can generate different queries, with each of the different queries using conditions applicable respectively to the fields selected for the applicable entity category. In some cases, members of different entity categories, likely from different systems, all can be collected in the single custom display if they satisfy the conditions that had been specified in connection with their respective entity categories.

Figure 3:
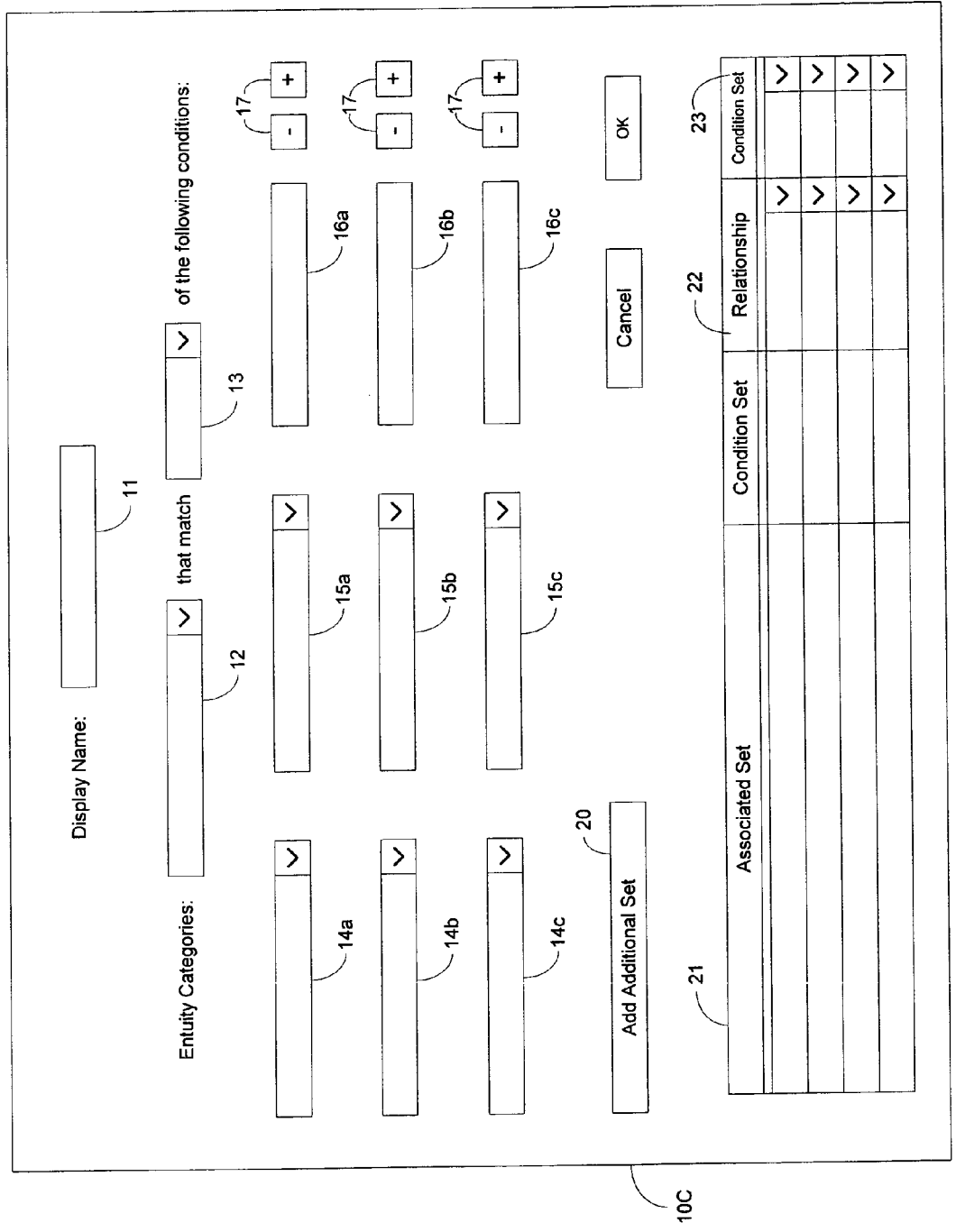
FIG. 3 is an example of a screen for defining a custom display that includes multiple associated sets of data and options for relationships between associated sets operating on the same entity category.

In the example of FIG. 3, additional sets can be added to the custom display and a screen 10C can be generated as shown in the example of FIG. 3. In this example, there are options for relationships between operations of associated sets on the same entity category. For operation of any one of the associated sets (a subject set), a box 22 drop-down permits selection of a relationship with operation of another one of the associated sets (an object set) on the same entity category, and a box 23 drop-down permits identification of the object set (or its respective condition set). Some examples of such relationships comprise "merge" (indicating that the results of the two separately operated sets should be merged in the custom display), "operate on results of" (indicating that operation of the subject set should screen only the results of operation of the object set (rather screening every member of the applicable entity category), and that being among the results of operation of the object set is not alone a sufficient basis for inclusion in the custom display), and so forth.

The different possible relationships between operations of associated sets can be used, for example, to set up logical relationships among multiple associated sets. In this way, a user can specify a hierarchy for running the queries that define the custom display. The "operate on results of" relationship is useful for narrowing the scope of members that will qualify for inclusion in a custom display. In some cases, the same narrowing also can be accomplished by adding conditions to a single set (as opposed to specifying a relationship between two sets operating on the same entity category). In some embodiments, similar narrowing can comprise including identifiers of the results of the operation of associated sets in the box 12 drop-down (i.e., among the list of identifiers of entity categories available to be queried), and including appropriate logic limiting which results that will be included in the display.

Figure 4:
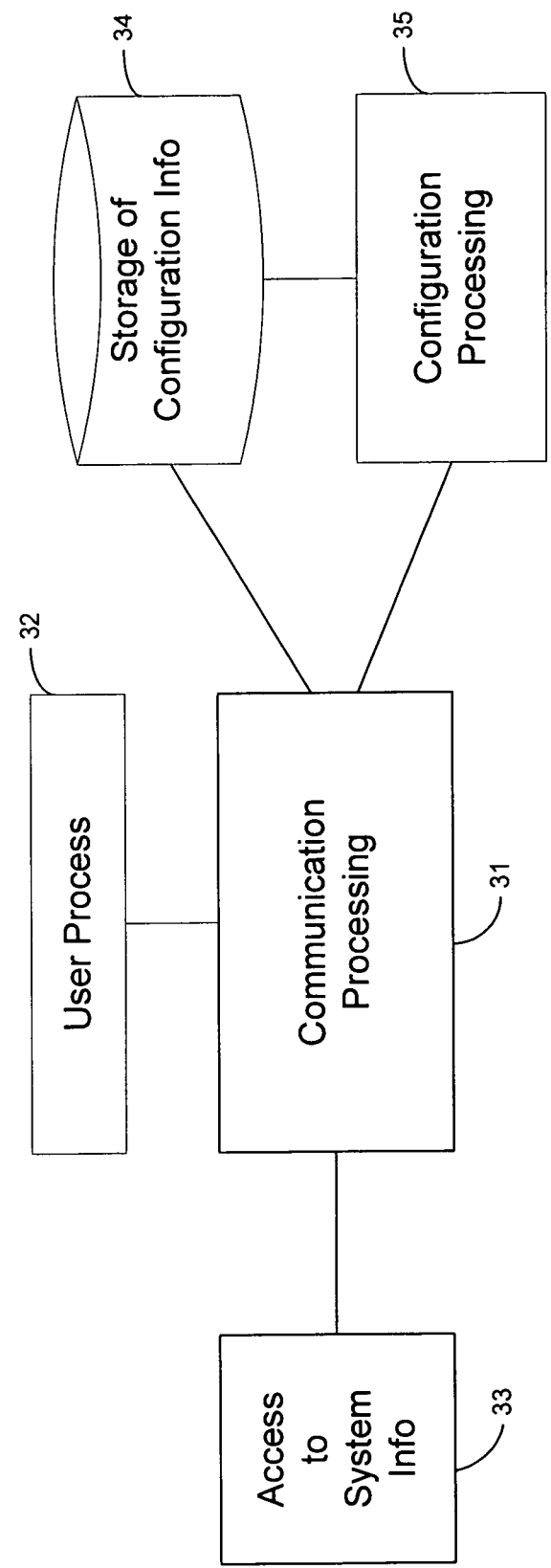
FIG. 4 is an example of a simplified functional block diagram for a custom display system.

FIG. 4 is an example of a simplified functional block diagram for a custom display system. There is communication processing 31 with user access 32 and access 33 to the data of the various target systems. The user-specified definitions of each of the different custom displays are stored 34, and retrieved for processing 35 whenever a current view of a particular custom display is requested by a user. For example, for each custom display, a custom display identifier is associated with the storage 34 of a list of entity categories, their condition qualifications, and their specified fields and corresponding conditions that define that custom display. Other examples of configuration information that is stored 34 comprise identification of all entity categories that may be queried for data to be included in a custom display, identification of the fields available within those entity categories and the types of conditions appropriate for each of those fields, and information necessary for accessing those entity categories. Any number of sources of data, including sources in external systems, may be made accessible to be queried for data to be included in a custom display.

Processing 35 includes generating screens such as a screens 10A, 10B and 10C for a user to define a custom display. The information shown in the drop downs of those screens depends on the information that is stored 34 identifying the available entity categories, the fields within those tables, and the types of conditions appropriate for those fields. New custom displays can be defined and previously defined custom displays can be redefined at any time. A means for generating screens that are used for defining the custom display can comprise, for example, code for providing an ability to define the custom display as discussed above, that is, for example, embedded in a computer-readable tangible medium such as, for example, hard disks, floppy disks, CD-ROMS, and tapes, and including, for example, magnetic disks and optical disks. A means for storing a definition of the display can comprise, for example, a tangible medium for storing digital data as is known in the art. Similarly, a means for redefining a display can comprise, for example, code embedded in a medium for viewing a previously defined custom display, revising the query requirements, and storing the redefined display.

Once a custom display has been defined and stored 34, a current view of the custom display can be dynamically created whenever requested. The current view will show the members of applicable entity categories that, at the time of the request, qualify in accordance with the previously stored 34 definition of the custom display. Multiple users may have access for requesting a current view of a previously defined custom display, without having to know how to create it.

Software for implementing the processing 35 is system-independent. Processing 35 a user request for a current view of a previously defined custom display relies on the previously stored 34 definition associated with the identifier of that custom display. It also can rely, for example, on previously stored 34 information that is necessary for accessing any particular entity category to be queried for that custom display, and accessing the values in the different fields for members of that entity category. Such access information can, for example, be metadata that has been plugged in and updated whenever appropriate, but is transparent and of no concern to a user.

Figure 5:
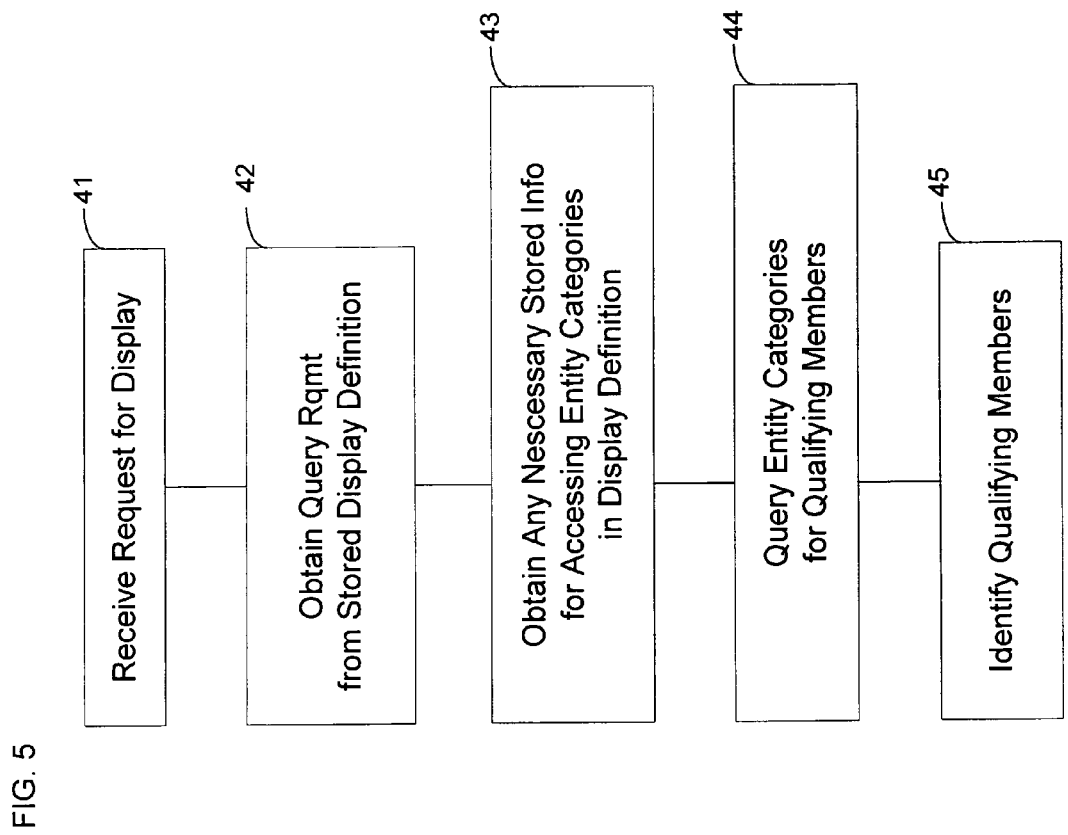
FIG. 5 is an example of a simplified flow diagram for providing a current view of a custom display.

FIG. 5 is an example of a simplified flow diagram for obtaining a current view of a custom display. A user request for a current view of a previously defined custom display is received 41. The information to be configured and displayed must be collected by querying various sources of data. The identifier of the custom display that is requested is used to obtain 42 query requirements that are stored for that custom display. This is the information was created when the custom display was defined or redefined. It includes the entity categories to be queried, and the conditions for different fields that must be satisfied by any member of any of those entity categories. Identification of the entity categories to be queried is used to obtain 43 any stored information that is necessary for accessing any of those entity categories and the current values in the different fields for any members of those entity categories. Using the query requirements and any necessary access information, applicable entity categories are queried 44 for qualified members of those entity categories. The qualified members have values in specified fields that satisfy specified conditions, the specified fields and conditions being part of the definition of the requested custom display. The current view of the requested custom display is provided by identifying 45 the members that are qualified at the time of the request. A means for dynamically obtaining the current view can comprise, for example, code embedded in a tangible medium for performing the operations discussed above and related communication and processing as is known in the art.

New or revised target systems (to be accessed for information) and new or revised entity categories within systems do not require rewriting the code for defining a custom display or obtaining a current view of the custom display. Stored information regarding the available entity categories (such as database tables), the fields within those entity categories and the types of conditions appropriate for those fields, and information necessary for accessing those entity categories may need to be updated if they change. However, the user need not install anything, and need not know anything about changes in access information. With respect to changes regarding available entity categories or their data fields, it may be desirable to evaluate previously defined custom displays. This can be done periodically, or the user can be alerted when there are applicable changes regarding available entity categories or their data fields.

The present invention of providing an open-ended and modifiable ability to customize the display of data for current viewing of the display is not limited to use with any particular application or to Contact Center administration and management. It can be used generically with any application that requires dynamic rules for current viewing of a custom display, and is not limited to a particular domain, particular systems, or particular databases.

From the foregoing, it will be observed that numerous modifications and variations can be effectuated without departing from the true spirit and scope of the novel concepts of the present invention. It is to be understood that no limitation with respect to the specific embodiments illustrated or described is intended or should be inferred.

What is claimed is:

1. A method of providing an ability to define a plurality of system independent custom displays of computer-readable data from multiple different target systems each having entity categories that have some attributes that are unique, the method comprising:
   providing, by a communication processor, a list of identifiers of entity categories available to be queried for information to be collected for a current view of the display whenever requested, each of the entity categories comprising at least one data field with actual values of the respective data fields for any one member of one of the entity categories representing actual properties of the one member that can be measured against user-specified conditions;
   providing a list of the data fields that exist respectively for each user selection of one of the entity categories to be queried;
   providing a list of types of conditions that are appropriate respectively for each user selection of one of the data fields;
   receiving a user-specified value for each user selection of one of the data fields;
   a condition, corresponding with any one particular user selection of one of the data fields, comprising a user-selected type of condition and a user-specified value for the one particular user selection of one of the data fields;
   for each user selection of one of the entity categories, permitting an end user of a plurality of users to select any number of the data fields and respectively corresponding conditions;
   permitting the user to associate any number of sets to define a respective system independent custom display definition and to define custom metadata for viewing the system independent custom display, each one of the sets comprising one particular user selection of one of the entity categories together with user-selected data fields and respectively corresponding conditions for the one particular user selection of one of the entity categories and storing the respective custom display definition including the custom metadata for future access, such that adding to or revising the target systems does not require rewriting code for defining custom displays; and
   retrieving the stored respective custom display definition and stored custom metadata transparent to the user for accessing the entity categories and dynamically creating the system independent custom display using the retrieved respective custom display definition and the retrieved custom metadata upon request by any user of the plurality of users.

2. The method according to claim 1, further comprising:
   providing a list of condition qualifications for each one of the sets;
   a user-selected condition qualification for any one particular set indicating which conditions of the one particular set need to be satisfied for a member of a user-selected entity category of the one particular set to qualify for inclusion in the display.

3. The method according to claim 2, at least one of the lists of the condition qualifications comprising at least one condition qualification selected from a group consisting of: all, any, at least two, and a first condition plus one other condition.

4. The method according to claim 1, further comprising: permitting the user to select a relationship between operation of a first one of the sets and operation of a second one of the sets.

5. The method according to claim 1, wherein a first one of the sets operates on one particular entity category, the method further comprising:
permitting the user to limit operation of a second one of the sets to screening only results of operation of the first one of the sets;
being included among the results of the operation of the first one of the sets not alone being a sufficient basis for including a particular one of the members of the one particular entity category in the display.

6. The method according to claim 1, further comprising: storing a custom display identifier in association with the sets and associated user defined custom metadata access information including updated metadata to allow viewing of the system independent custom display; and obtaining a current view of one of the plurality of system independent custom displays by identifying entity category members that have values in the selected fields that satisfy the corresponding conditions.

7. The method according to claim 1, further comprising:
storing the list of the identifiers of the entity categories available to be queried;
storing the lists of the data fields that exist for each of the entity categories available to be queried;
storing the lists of the types of conditions appropriate for each of the data fields that exists for each of the entity categories available to be queried.

8. The method according to claim 1, further comprising: storing information necessary for accessing the entity categories available to be queried.

9. The method according to claim 1, at least one of the entity categories available to be queried comprising constantly changing information being tracked by a real-time system that can be accessed.

10. The method according to claim 1, at least one of the entity categories available to be queried being selected from a group consisting of: agents, agent groups, agent super groups, trunk groups, ANIs, DNISs, supervisor teams, agent supervisors, announcements, categories of contact subject matter, classes of service, clients of a central administering system, system managers, technicians, agent performance, agent productivity, services that can be provided by agents, agent availability states, contact processing times, contact backlogs, contact types, and current status of contacts.

11. The method according to claim 1, at least one of the lists of the types of conditions comprising at least one type of condition selected from a group consisting of: contains, does not contain, is, is not, starts with, ends with, is greater than, is less than, and is in the range.

12. A system for defining a system independent custom display of computer-readable data from a plurality of different target systems and obtaining a current view of the display whenever requested, the system comprising:
a communication processor, the communication processor comprising user access and access to entity categories available to be queried for information to be collected for the current view, each of the entity categories comprising at least one data field with actual values of the respective data fields for any one member of one of the entity categories representing actual properties of the one member that can be measured against user-specified conditions;
storage for storing a definition of the display including user defined custom metadata for viewing the system independent custom display, for storing a list of identifiers of the entity categories available to be queried, for storing lists of the data fields that exist for each of the entity categories, for storing lists of types of conditions appropriate for each of the data fields that exists for each of the entity categories, and for storing information necessary for accessing the entity categories including updated metadata which is transparent to the user;
a screen generator for generating screens that are used for defining the display;
a configurator for collecting members of entity categories that qualify for inclusion in the display based on the stored definition of the display including the user defined custom metadata, whenever the current view of the display is requested and for using the stored updated metadata for accessing entity categories such that adding or revising the target systems does not require rewriting code for defining the custom display;
wherein the definition of the display can comprise any number of sets, each one of the sets comprising an identifier of a user-selected one of the entity categories together with any number of user-selected data fields and their respectively corresponding user-specified conditions.

13. The system according to claim 12, the entity categories comprising a plurality of entity categories that can accessed respectively in different systems.

14. The system according to claim 12, at least one of the entity categories available to be queried comprising constantly changing information being tracked by a real-time system that can be accessed.

15. The system according to claim 12,
a particular condition corresponding with a particular data field comprising a user-specified value for the particular data field and a user-selected one of the types of conditions appropriate for the particular field;
each one of the sets further comprising a condition qualification;
the condition qualification for a particular one of the sets indicating which of the conditions of the one particular set need to be satisfied for a member of the one of the entity categories identified for the one particular set to qualify for inclusion in the display.

16. The system according to claim 15, further comprising storage for storing a list of the condition qualifications, the list of condition qualifications comprising at least one condition qualification selected from a group consisting of: all, any, at least two, and a first condition plus one other condition.

17. The system according to claim 12, the definition of the display further comprising:
wherein a first one of the sets operates on one particular entity category;
operation of a second one of the sets comprising screening only results of operation of the first one of the sets;
being included among the results of the operation of the first one of the sets not alone being a sufficient basis for including a particular one of the members of the one particular entity category in the display.

18. The system according to claim 12, at least one of the entity categories available to be queried being selected from a group consisting of: agents, agent groups, agent super groups, trunk groups, ANIs, DNISs, supervisor teams, agent supervisors, announcements, categories of contact subject matter, classes of service, clients of a central administering system, system managers, technicians, agent performance, agent productivity, services that can be provided by agents, agent availability states, contact processing times, contact backlogs, contact types, and current status of contacts.

19. The system according to claim 12, at least one of the lists of the types of conditions comprising at least one type of condition selected from a group consisting of: contains, does not contain, is, is not, starts with, ends with, is greater than, is less than, and is in the range.

20. A non-transitory computer-readable tangible medium having code embedded in the medium for providing an ability to define a system independent custom display of data for a plurality of different target systems each system having entity categories that have some attributed that are unique, the computer-readable medium comprising:
instructions for the following:
providing a list of identifiers of entity categories available to be queried for information to be collected for a current view of the display whenever requested, each of the entity categories comprising at least one data field with actual values of the respective data fields for any one member of one of the entity categories representing actual properties of the one member that can be measured against user-specified conditions;
providing a list of the data fields that exist respectively for each user selection of one of the entity categories to be queried;
providing a list of types of conditions that are appropriate respectively for each user selection of one of the data fields;
receiving a user-specified value for each user selection of one of the data fields;
a condition, corresponding with any one particular user selection of one of the data fields, comprising a user-selected type of condition and a user-specified value for the one particular user selection of one of the data fields;
for each user selection of one of the entity categories, permitting a user to select any number of the data fields and respectively corresponding conditions;
permitting the user to associate any number of sets with the display to define the system independent custom display and to defile custom metadata for viewing the system independent custom display, each one of the sets comprising one particular user selection of one of the entity categories together with user-selected data fields and respectively corresponding conditions for the one particular user selection of one of the entity categories and storing the sets including the user customized metadata with a custom displaying identifier and access information including user transparent updated metadata for accessing the entity categories.

21. The non-transitory computer-readable medium according to claim 20, the computer-readable medium further comprising:
instructions for the following:
providing a list of condition qualifications for each one of the sets;
a user-selected condition qualification for any one particular set indicating which conditions of the one particular set need to be satisfied for a member of a user-selected entity category of the one particular set to qualify for inclusion in the display;
at least one of the lists of the condition qualifications comprising at least one condition qualification selected from a group consisting of: all, any, at least two, and a first condition plus one other condition.

22. The non-transitory computer-readable medium according to claim 20, the computer-readable medium further comprising: instructions for permitting the user to select a relationship between operation of a first one of the sets and operation of a second one of the sets.

23. The non-transitory computer-readable medium according to claim 20, the computer-readable medium further comprising:
instructions for the following:
wherein a first one of the sets operates on one particular entity category;
permitting the user to limit operation of a second one of the sets to screening only results of operation of the first one of the sets;
being included among the results of the operation of the first one of the sets not alone being a sufficient basis for including a particular one of the members of the one particular entity category in the display.

24. The non-transitory computer-readable medium according to claim 20, at least one of the entity categories available to be queried comprising constantly changing information being tracked by a real-time system that can be accessed.

25. The non-transitory computer-readable medium according to claim 20, at least one of the entity categories available to be queried being selected from a group consisting of: agents, agent groups, agent super groups, trunk groups, ANIs, DNISs, supervisor teams, agent supervisors, announcements, categories of contact subject matter, classes of service, clients of a central administering system, system managers, technicians, agent performance, agent productivity, services that can be provided by agents, agent availability states, contact processing times, contact backlogs, contact types, and current status of contacts.

26. The non-transitory computer-readable medium according to claim 20, at least one of the lists of the types of conditions comprising at least one type of condition selected from a group consisting of: contains, does not contain, is, is not, starts with, ends with, is greater than, is less than, and is in the range.

* * * * *